(12) United States Patent
Li et al.

(10) Patent No.: US 10,515,301 B2
(45) Date of Patent: Dec. 24, 2019

(54) SMALL-FOOTPRINT DEEP NEURAL NETWORK

(71) Applicant: Microsoft Technology Licensing, LLC, Redmond, WA (US)

(72) Inventors: Jinyu Li, Redmond, WA (US); Yifan Gong, Sammamish, WA (US); Yongqiang Wang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 931 days.

(21) Appl. No.: 15/000,852

(22) Filed: Jan. 19, 2016

(65) Prior Publication Data

US 2016/0307095 A1   Oct. 20, 2016

Related U.S. Application Data

(60) Provisional application No. 62/149,395, filed on Apr. 17, 2015.

(51) Int. Cl.
  *G06N 3/02* (2006.01)
  *G06N 3/04* (2006.01)
  *G06N 3/08* (2006.01)

(52) U.S. Cl.
  CPC .............. *G06N 3/04* (2013.01); *G06N 3/02* (2013.01); *G06N 3/08* (2013.01)

(58) Field of Classification Search
  CPC ............ G06N 7/00; G06N 99/00; G06N 3/02; G06N 3/04; G06N 3/08
  See application file for complete search history.

(56) References Cited

U.S. PATENT DOCUMENTS

| | | | |
|---|---|---|---|
| 6,347,297 B1 | 2/2002 | Asghar | |
| 6,418,412 B1 | 7/2002 | Asghar | |
| 8,126,710 B2 | 2/2012 | Germello et al. | |
| 8,311,813 B2 | 11/2012 | Vaisan | |
| 8,527,276 B1 | 9/2013 | Senior | |
| 9,153,231 B1* | 10/2015 | Salvador | G10L 15/065 |
| 9,454,958 B2 | 9/2016 | Li et al. | |
| 2002/0116196 A1* | 8/2002 | Tran | G06F 1/3203 704/270 |
| 2005/0267739 A1 | 12/2005 | Kontio | |
| 2006/0190254 A1 | 8/2006 | Iser et al. | |
| 2009/0012785 A1 | 1/2009 | Chengalvarayan | |
| 2009/0210218 A1 | 8/2009 | Collobert et al. | |
| 2011/0264447 A1 | 10/2011 | Visser et al. | |
| 2012/0166186 A1 | 6/2012 | Acero et al. | |

(Continued)

FOREIGN PATENT DOCUMENTS

EP      454037      10/1991

OTHER PUBLICATIONS

Wang et al. Small-Footprint High-Performace Deep Neural Network-Based Speech Recognition Using Split-VQ, Apr. 2015, 5 pages.

(Continued)

*Primary Examiner* — Vincent Gonzales

(57) ABSTRACT

Conversion of a large-footprint DNN to a small-print DNN is performed using a variety of techniques, including split-vector quantization. The small-foot print DNN may be distributed to a variety of devices, including mobile devices. Further, the small-footprint DNN may aid a digital assistant on a device in interpreting speech input.

20 Claims, 11 Drawing Sheets

(56) References Cited

U.S. PATENT DOCUMENTS

| | | |
|---|---|---|
| 2013/0212052 A1 | 8/2013 | Yu |
| 2013/0304683 A1 | 11/2013 | Lo |
| 2014/0067735 A1 | 3/2014 | Yu |
| 2014/0142929 A1 | 5/2014 | Seide |
| 2014/0257804 A1 | 9/2014 | Li |
| 2014/0372112 A1 | 12/2014 | Xue |
| 2016/0217369 A1* | 7/2016 | Annapureddy ........ G06N 3/082 |

OTHER PUBLICATIONS

PCT Second Written Opinion mailed in International Application PCT/US2016/027174, dated Mar. 17, 2017, 5 pgs.
Fan, et al., "Joint Encoding of the Waveform and Speech Recognition Features Using a Transform CODEC", in Proc. ICASSP, May 2011, 3 pages.
Jaitl Y, "An Application of Pretrained Deep Neural Networks to Large Vocabulary Conversational Speech Recognition", Tech. Rep. 001, Department of Computer Science, University of Toronto, 2012, 11 pages.
Mohamed, et al., "Acoustic Modeling using Deep Belief Networks", Retrieved at http://www.cs.toronto.edu/~hinton/absps/speechDBN_jrnl.pdf, In Journal Transactions on Audio, Speech, and Language Processing, Mar. 23, 2011, 10 pages.
Mohamed, et al., "Investigation of Full-Sequence Training of Deep Belief Networks for Speech Recognition", in Proc. Interspeech 2010, Sep. 2010, 3 pages.
Mohamed, et al., "Understanding how Deep Belief Networks Perform Acoustic Modelling", in Proc. ICASSP, 2012, 4 pages.
Moreno, et al., "Sources of Degradation of Speech Recognition in the Telephone Network", in Proc. ICASSP, Adelaide, Australia, vol. 1, Apr. 1994, 3 pages.
Povey, et al., "Boosted MMI for Model and Feature Space Discriminative Training", in Proc. ICASSP, 2008, 4 pages.
Povey, et al., "fMPE: Discriminatively Trained Features for Speech Recognition", in Proc. ICASSP, 2005, 8 pages.
Sainath, et al., "Making Deep Belief Networks Effective for Large Vocabulary Continuous Speech Recognition", in Proc. ASRU 2011, 2011, 6 pages.
Seide, et al., "Conversational Speech Transcription Using Context-Dependent Deep Neural Networks,", in Proc. Interspeech 2011, 2011, 3 pages.
Seltzer, et al., "Robust Bandwidth Extension of Noise-Corrupted Narrowband Speech", in Proc. Interspeech, 2005, 3 pages.
Seltzer, et al., "Training Wideband Acoustic Models Using Mixed-Bandwidth Training Data for Speech Recognition", IEEE Transactions on Audio, Speech, and Language Processing, vol. 15, No. 1, 2007, 10 pages.
U.S. Appl. No. 13/787,821, Amendment and Response filed Sep. 2, 2015, 22 pages.
U.S. Appl. No. 13/787,821, Amendment and Response filed Mar. 17, 2016, 10 pages.
U.S. Appl. No. 13/787,821, Notice of Allowance dated May 24, 2016, 9 pages.
U.S. Appl. No. 13/787,821, Office Action dated Mar. 12, 2015, 23 pages.
U.S. Appl. No. 13/787,821, Office Action dated Nov. 17, 2015, 26 pages.
Vanhoucke, et al., "Improving the Speed of Neural Networks on CPUs", in Proc. Deep Learning and Unsupervised Feature Learning Workshop, NIPS, 2011, 8 pages.
Yao et al., "Adaption of Content-Dependent Deep Neural Networks for Automatic Speech Recognition", IEEE, Dec. 2, 2012.
Yu, et al., "Automated Directory Assistance System—From Theory to Practice", in Proc. Interspeech, 2007, 4 pages.
Yu, et al., "Roles of Pretraining and Fine-Tuning in Context-Dependent DNN-HMMs for Real-World Speech Recognition", in Proc. NIPS Workshop on Deep Learning and Unsupervised Feature Learning, Dec. 2010, 8 pages.
Huang et al., "Deep Leraning Vector Quantization for Acoustic Information Retrieval", May 4, 2014, 5 pages.
Katagiri et al., "A New Hybrid Algorithm for Speech Recognition Based on HMM Segmentation and Learning Vector Quantization", Oct. 1993, 11 pages.
Lei et al., "Accurate and Compact Large Vocabulary Speech Recognition of Mobile Devices", Aug. 25, 2013, 4 pages.
Li et al., "Deep Neural Network for Automatic Speech Recognition; from the Industry's View", Sep. 13, 2014, 80 pages.
Diez, "Automatic Language Recognition Using Deep Neural Networks", Sep. 2013, 67 pages.
Tokuda et al., "Directly Modeling Speech waveforms by Neural Networks for Statistical Parametric Speech Synthesis", Apr. 19, 2015, 5 pages.
Dahl et al., "Context-Dependent Pre-Trained Deep Neural Networks for Large-Vocabulary Speech Recognition", Jan. 2012, 13 pages.
Hinton et al., "Deep Neural Networks for Acoustic Modeling in Speech Recognition", Nov. 2012, 27 pages.
Bacchiani et al., "Context Dependent State Tying for Speech Recognition Using Deep Neural Network Acoustic Models", May 4, 2014, 5 pages.
Ghai et al., "Literature Review on Automatic Speech Recognition", Mar. 2012, 9 pages.
Li et al., "Improving Wideband Speech Recognition Using Mixed-Bandwidth Training Data in Cd-Dnn-Hmm", Dec. 2, 2012, 6 pages.
Zen et al., "Statistical Parametric Speech Synthesis Using Deep Neural Networks", May 26, 2013, 5 pages.
Yu et al., "The Deep Tensor Neural Network With Applications to Large Vocabulary Speech Recognition", Feb. 2013, 9 pages.
PCT International Search Report in PCT/US2016/027174, dated Jul. 26, 2016, 14 pages.
Falali et al., "Data-Driven Vector Clustering for Low-Memory Footprint ASR", Sep. 16, 2002, 5 pages.
Xue et al., "Singular Value Decomposition based low-footprint speaker adaption and personilzation for deep neural network", May 4, 2014, 5 pages.
Martinez et al., "Stacked Quantizer for Compositinoal Vector Compression", Nov. 8, 2014, 8 pages.
Xue et al., "Restructuring of Deep Neural network Acoustic Models with Singular Valve Decomposition", Aug. 25, 2013, 5 pages.

* cited by examiner

SMALL-FOOTPRINT DEEP NEURAL NETWORK

CROSS-REFERENCE TO RELATED APPLICATION(S)

This application claims priority to Provisional Patent Application No. 62/149,395, filed Apr. 17, 2015, entitled "SMALL-FOOTPRINT DEEP NEURAL NETWORK," which application is incorporated herein by reference in its entirety.

BACKGROUND

Computers often use speech recognition software to convert audio input into recognizable commands. For example, a mobile device may use speech recognition software to interpret a user's speech. Such speech recognition may be useful when a user is interacting with a digital assistant on a mobile device. The user's speech is received by the mobile device as an audio signal (by way of a microphone located on the mobile device, for example). The audio signal may then be processed by the mobile device or by a device communicatively coupled to the remote device.

A Deep Neural Network (DNN) is used to analyze multiple aspects of audio signals. For a DNN to be used in analysis of these aspects of the audio signal, the typical DNN requires the storage a substantial amount of information. For example, some DNN technologies have the ability to recognize a large set of vocabulary that usually consists of more than 6,000 senones (clustered triphone states) and 5-7 hidden layers, each with about 2,000 nodes. This leads to more than 30 million model parameters. Thus, some DNNs require a significant amount of computer resources both with respect to memory to store the model parameters and processing power to perform calculations related to these model parameters. As such, it remains desirous to develop DNN technology that can reduce memory and computing processing requirements while maintaining an adequate level of speech recognition.

It is with respect to these and other general considerations that aspects of the technology have been made. Also, although relatively specific problems have been discussed, it should be understood that the embodiments should not be limited to solving the specific problems identified in the background.

SUMMARY

The technologies described herein generally relate to converting a neural network system having a relatively large footprint (e.g., larger storage size) into a neural network system having a relatively smaller footprint (e.g., smaller storage size) such that the smaller-footprint neural network system may be more easily utilized by on one or more resource constrained devices. Aspects disclosed herein relate to reducing the storage size of a large-footprint DNN having one or more matrices. The one or more matrices of the large-footprint DNN store numerical values that are used in evaluating features of an audio signal. Evaluation of these features using the numerical values in the matrices allows the large-footprint DNN to determine a probability that the audio signal corresponds to particular utterance, word, phrase, and/or sentence.

As discussed below, aspects of this disclosure relate to conversion techniques, that when applied to one or more matrices of a large-footprint DNN, result in a smaller matrix size. One conversion technique includes analyzing vectors of a large-footprint DNN matrix to identify portions of the vectors (e.g., sub-vectors) that have similar numerical properties. Sub-vectors with similar numerical properties are grouped. An approximation (or codeword) of the group may be determined for a group. Codewords are then indexed into a codebook, which contains the address of the codewords. In aspects of technology, after the codebook is obtained, the codewords can be fine-tuned using a variety of neural network training techniques. Using the codebook to index to the appropriate codeword corresponding to the groups of sub-vectors, a small-footprint DNN matrix can be formed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
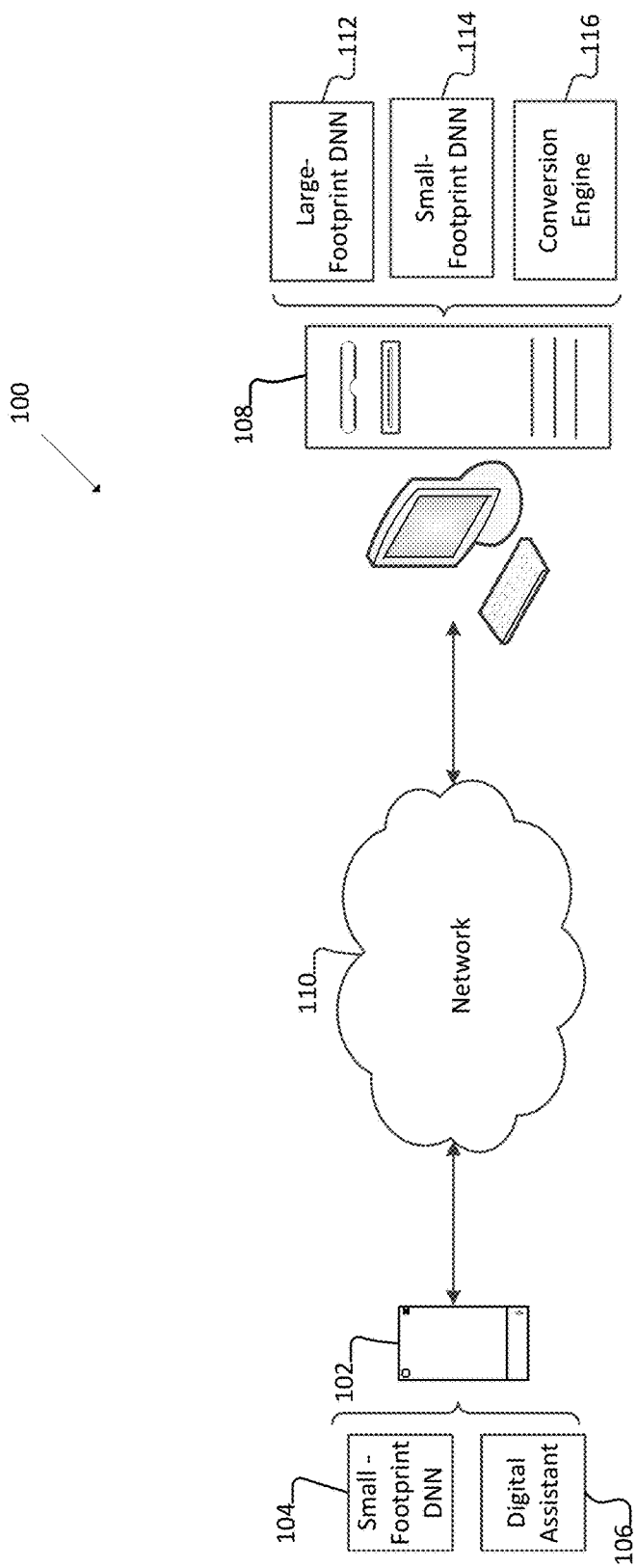
FIG. 1 illustrates an exemplary system in which a small-footprint DNN may be created or used.

Aspects of the current technology relate to computer memory, systems, and methods for developing and deploying neural network (DNN) systems having relatively small footprints, such as, for example, a small-footprint DNN. More particularly, aspects of the current technology relate to modifying or converting an existing DNN that has a relatively large footprint (e.g., require larger storage space) to a DNN having a relatively smaller footprint (e.g., require smaller storage space), but still having substantially similar speech recognition capabilities.

A neural network system is a system that uses a number of inputs to predict a set of outputs. For example, a neural network may be used to predict an intended utterance, word, sentence, or phrase based on an audio signal input into the system. The neural network will use the input, or a set of inputs (e.g., features of the audio signal), to predict a set of outputs (e.g., the phonemes of a person's speech). These inputs will trigger nodes within the neural network (e.g., input nodes), which may, in turn, trigger a set of outputs (e.g., output nodes). A neural network may be used to produce a set of outputs that adequately predicts the actual event based on the inputs. As an example, a neural network that is trained to predict speech will have a higher likelihood of predicting the actual spoken phoneme based on the audio signal.

Input nodes may be connected to output nodes through a series of hidden nodes. Additionally, input nodes may be connected to multiple nodes. Thus, whether a node is activated based on a trigger node (e.g., a node that is directly connected to pervious node in the directed chain) may be determined based on the weights assigned to the connections between nodes.

The relations and weights between the nodes may be represented by a matrix. That is, the neural network may have a matrix that will define the relationship between each node so that, given an input, the neural network can sufficiently predict an output. As used herein, a large-footprint DNN may be a DNN where the matrix has not had values approximated, whereas a small-footprint DNN may be a DNN resulting from the application of one or more of the technologies described herein on a large-footprint DNN, which technologies may be used to approximate one or more values of the large-footprint DNN. Further, the small-footprint DNN may be a DNN that uses less memory and computing power than a large-footprint DNN while still providing an adequate amount of speech recognition to support interaction with a user of a computing device.

The small-footprint DNN may be used on a variety of devices to aid in speech recognition. For example, the small-footprint DNN may be used on a mobile device or wearable device, which typically has less memory and computing power than a larger computing system, such as a server system or a desktop computer system. The small-footprint DNN may interact with, or be utilized by, or used in conjunction with, a digital assistant to interpret a user's voice input to the digital assistant. For example, a user of a digital assistant may command the digital assistant to "call home." The small-footprint DNN may interpret the audio signal of the voice input and provide the appropriate information to the digital assistant, which may then perform a requested action. The small-footprint DNN may also be used be used on a tablet, a server, a laptop, a desktop, or other computing device, even if such computing devices may be considered a large computing device. While examples disclosed herein relate to using a small-footprint DNN for speech recognition and/or with a personal digital assistant, one of skill in the art will appreciate that the aspects disclosed herein may be used for other purpose by other types of applications without departing from the spirit of this disclosure.

FIG. 1 illustrates an exemplary system 100 in which a small-footprint DNN 104 may be created and/or used. As illustrated, system 100 includes two devices, a client computing device 102 on which a copy of small-footprint DNN 104 and a digital assistant 106 are stored. A remote computing device 108 is connected to the client computing device 102 through a network 110. The remote computing device 108 may store a large-footprint DNN 112, a small-footprint DNN 114, and a conversion engine 116.

The client computing device 102 may be a mobile device, a smart phone, a tablet, a phablet, a laptop, a desktop, a wearable device, or any suitable processing device in which the technologies described herein may be practiced. The digital assistant 106 (which is an application program capable of receiving natural language input and completing electronic tasks based on the received input) may receive input via a microphone or a graphical user interface (GUI) on the client computing device 102. In another example, the input may be received from another device in communication with the client computing device 102.

For example, the digital assistant 106 may receive input from a microphone located on the client computing device 102. In particular, a user may ask the digital assistant 106 a question such as "Get directions to the airport?" or "Where is the nearest restroom?" The digital assistant 106 may be programmed to take an appropriate action based on the user input. Aspects of the technology include using a copy of the small-footprint DNN 104 stored on the client computing device 102 to transform the received audio input representing into input interpretable by the digital assistant 106.

Further, aspects of the technology include the conversion engine 116 performing one or more conversion techniques on the large-footprint DNN 112 to form the small-footprint DNN 114. For example, the matrix of a large-footprint DNN 112 may be approximated in such a way that reduces the storage space required to store the DNN. Specific techniques to convert a large-footprint DNN 112 to a small-footprint DNN 114 are discussed more fully with reference to FIGS. 2-5.

The small-footprint DNN 114 may be one that takes less memory than the large-footprint DNN 112. For example, the large-footprint DNN 112 may have a size of around 60 MB, while the small-footprint DNN 114 may only have a size of 3.2 MB. Other sizes may be employed without departing from the scope of this disclosure. Additionally, aspects of the technology provide for generating a small-footprint DNN 114 in a manner such that it has the same or similar speech recognition performance as the large-footprint DNN 112.

The small-footprint DNN 114 may be distributed to one or more computing devices such as a client computing device 102. For example, a client computing device 102 may have limited storage capacity such that storing the large-footprint DNN 112 may not be feasible. Rather, and as illustrated, the client computing device 102 may store a copy of the small-footprint DNN 104. Further, the copy of the small-footprint DNN 104 may be used to interpret natural language input and provide a transformed representation of the natural language to a format or form compatible with the digital assistant 106. For example, a user may enter input to the client computing device 102 as an audio signal by speaking to a digital assistant 106, such as Cortana® or Siri®. While examples provided herein are discussed with respect to providing the transformed input to a personal digital assistant, one of skill in the art will appreciate that the transformed input may be provided to an operating system or other types of applications such as, for example, a browser, a search bar, a calendar application, a word processing application, an email application, or any other type of application configured to receive input and perform a task based upon the received input.

Additionally, aspects of the technology may also comprise using a small-footprint DNN on other client computing devices 102, such as computing devices with a larger storage capacity. Indeed, a small-footprint DNN may be stored on a server and be remotely accessed by digital assistants on various computing devices.

The network 110 is used to connect one or more devices, such as the client computing device 102 and the remote computing device 108. For example, the network may include LANs, WANs, cellular network, POTS, a cellular data network, and/or the Internet. In other embodiments, devices 102 and 108 may be connected without a network.

Figure 2:
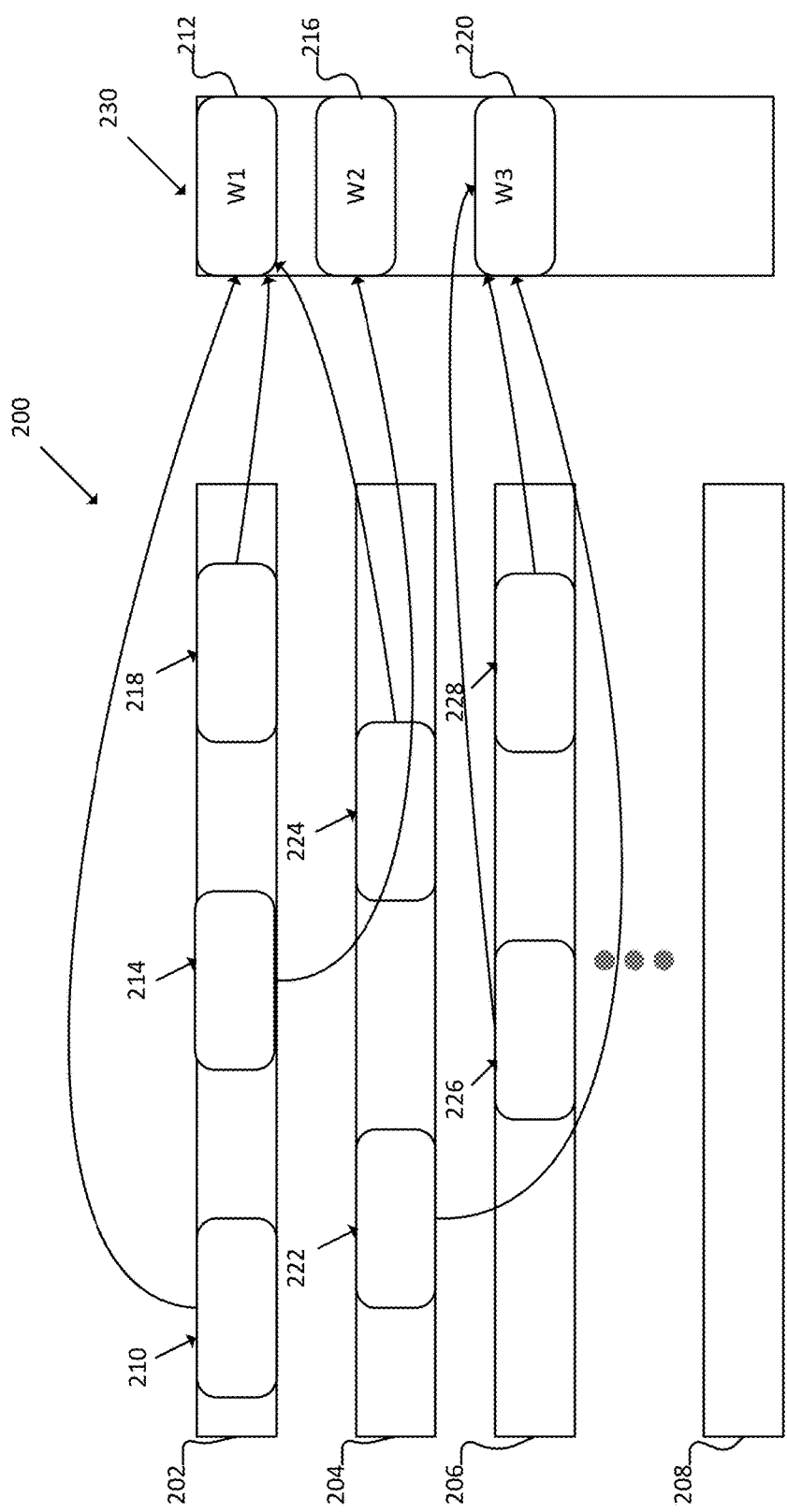
FIG. 2 illustrates an exemplary representation of a large-footprint DNN matrix compression.

FIG. 2 illustrates a representation of a compression process for a large-footprint DNN matrix 200. In examples, the large-footprint DNN matrix may be compressed using split-vector quantization. As illustrated in FIG. 2, the large-footprint DNN has a first row vector 202, a second row vector 204, and a third row vector 206. The large-footprint DNN matrix 200 may have any number or rows. The large-footprint DNN matrix 200 includes n number of rows, as illustrated by the $n^{th}$ row 208. Each row vector in the matrix (for example, row 200 to row 208 in FIG. 2) is divided into a number of sections, referred herein to as sub-vectors. After the division, these sub-vectors are put together into a set of sub-vectors.

A process may be applied to sub-vectors to identify the subvectors that may be approximated by a codeword. A codeword is a numerical approximation of a portion of a subvector. Aspects of the technology include identifying a codewords that may be used to approximate multiple portions of subvector while still maintaining sufficient functionality of the DNN-matrix. For example, a process may be applied to sub-vector 210 to identify that sub-vector 210 has similar numerical properties as sub-vectors 218 and 224. In the illustrated example, sub-vectors 210, 218 and 224 are determined to have similar numerical values and are thus all approximated by the codeword W1 212.

Additionally, a second sub-vector 214 of the first row vector 202 may have numerical properties that can be approximated by the W2 codeword 216. Further, there may be a third section 218 of the first row vector 202 that has numerical properties that can be approximated by the codeword W1 212.

Similarly, the second row vector 204 may be split into sub-vectors to identify sub-vectors with similar properties. For example, the second row vector 204 may have a fourth section 222 that has numerical properties which can be estimated by a W3 codeword 220. Additionally, the second row vector 204 may have a fifth section 224 that has numerical properties which can be estimated by the W1 codeword 212. The third row vector 206 comprises a sixth section 226 and a seventh section 228, both of which may be approximated by the W3 codeword 220.

Analyzing each sub vector of matrix 200 may continue until all sub vectors of matrix 200 have been analyzed. Aspects of the technology may include having all or some portions of a row vector of a matrix approximated by one or more codewords.

The first codeword W1 212, the second codeword W2 216, and the third codeword W3 220 may be stored in memory 230. Thus, the location of portions of the matrix 200 that may be approximated by one of the first codeword W1 212 (e.g., sub-vector 210, 218, and 224), the second codeword W2 216 (e.g., sub-vector 214), and the third codeword W3 220 (e.g., subvectors 222, 226, and 228) may reference the location in the memory 230 where the appropriate sub-vector is stored. While the example illustrated in FIG. 2 describes the creation of three sub-vectors, one of skill in the art will appreciate that more or fewer sub-vectors may be created without departing from the spirit of this disclosure.

Figure 3:
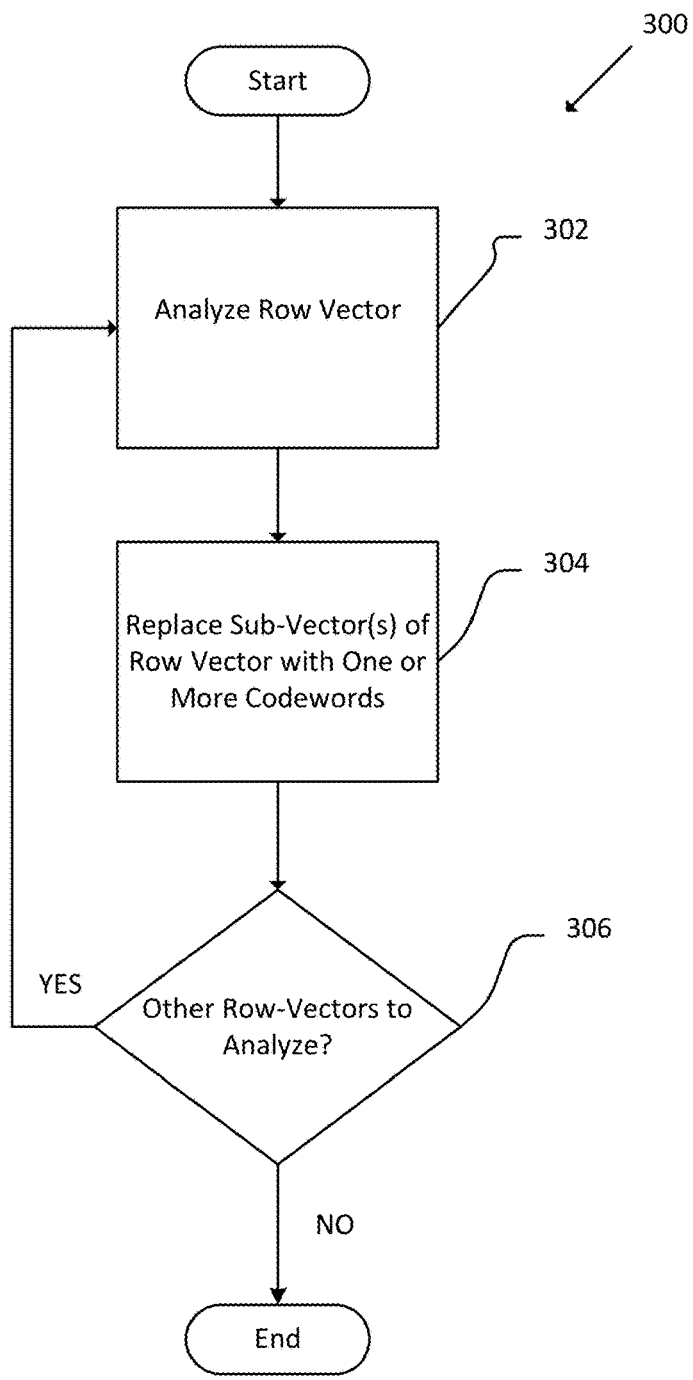
FIG. 3 illustrates an exemplary method for performing a split vector quantization on a large-footprint DNN.

FIG. 3 illustrates a method 300 for performing split vector quantization on a large-footprint DNN. The method 300 may be performed by a computing device, such as the remote computing device 108 from FIG. 1. In alternate examples, the method 300 may be performed by multiple computing devices, where different steps are performed by different machines. For example, the method 300 may be performed using a distributed computing network (e.g., a cloud network). The operations of the method 300 may be implemented in hardware, software, or a combination of hardware and software. The method 300 begins with analyze a row vector operation 302. In analyze a row-vector operation 302, a row vector of a matrix with a plurality of rows is analyzed. The row vector is analyzed for one or more portions of the row vector which may be approximated by a codeword. This may occur by partitioning the row vector into sub vectors, and then analyzing each sub vector to determine whether there is sufficient similarity between multiple subvectors such that the sub vector may be approximated by a codeword. Sufficient similarity is similarity between subvector values where they may be approximated by the same codeword while maintaining a sufficient functionality of the resulting small-footprint DNN.

The method 300 proceeds to replace identified portion of the row-vector with approximated codeword operation 304. Replacement of the identified sub-vector may occur by approximating the portion of the row vector with a pointer to the corresponding codeword. This approximated value may be pointed to other portions of the matrix (either in the same row vector or a different row vector). In aspects of the technology, the memory footprint is decreased where the approximated codeword is referred to by multiple subvectors.

The method 300 proceeds to determine operation 306 where a determination is made as to whether other row vectors of the matrix need be analyzed. One method of determination involves a sequential step through of all rows of a matrix from 1 to n, where n is the number of rows in the matrix and x is the current row being analyzed. In such a case, if n equals x then the all vectors of a matrix have been analyzed and the method 300 ends. If n does not equal x, then method 300 increases x to x+1 in operation 306, and returns to operation 302.

Figure 4:
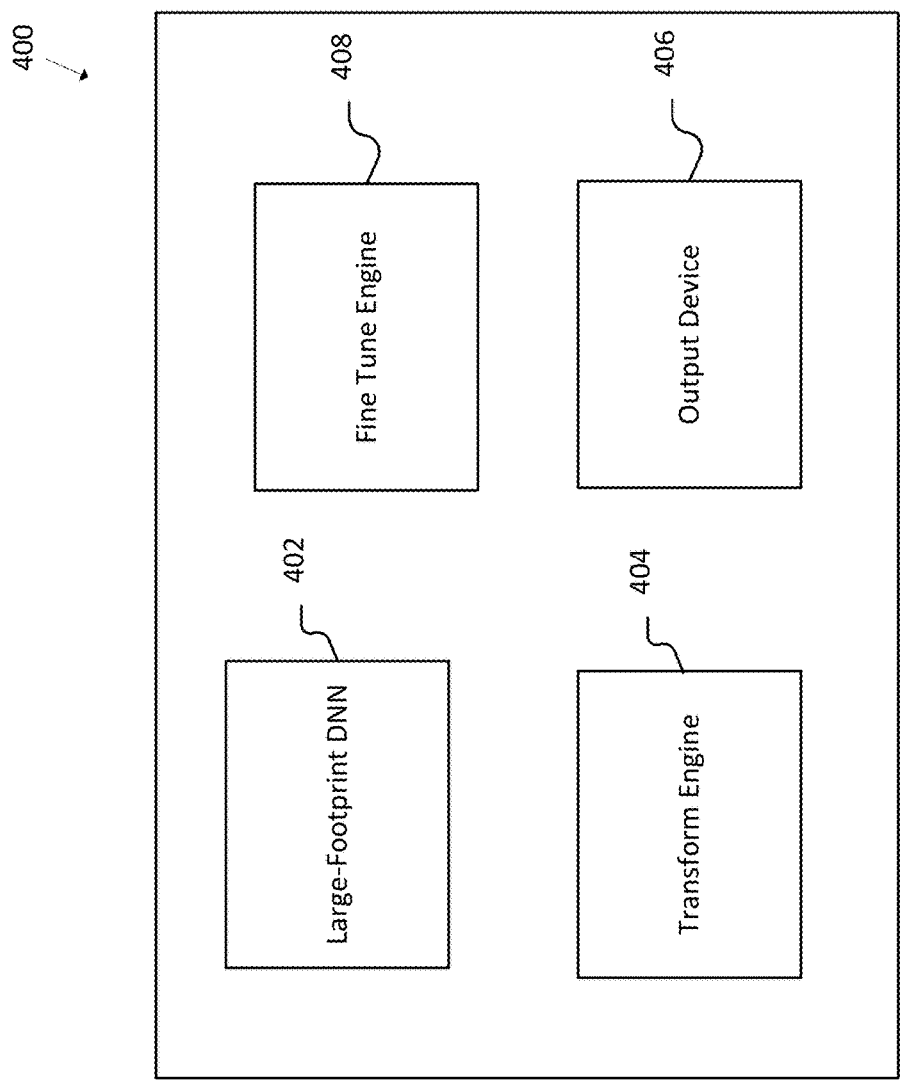
FIG. 4 illustrates an exemplary system to convert a large-footprint DNN to a small-footprint DNN.

FIG. 4 illustrates a system 400 to convert a large-footprint DNN to a small-footprint DNN. As illustrated, FIG. 4 illustrates a large-footprint DNN 402, a transform engine 404, an output device 406, and a fine tune engine 408. The different engines may be implemented in hardware, software, or a combination of hardware and software.

A large-footprint DNN 402 determines the probability that an input feature vector corresponds to a specific output. For example, for audio signal interpretation, an audio signal may be rendered into input feature vectors. The large-footprint DNN 402 uses a matrix that allows for the prediction of that a user uttered a phenome, word, or phrase, based on the particular features of a sound signal.

For example, given an input feature vector x, a L-layer network predicts posterior distributions of senones (e.g., tied phenome states identifiers), $p=[p_1, :::, p_s]^T$ by the following feed-forward process:

$$z^0 = x^t$$
$$z^{(l+1)} = \sigma(A^{(l)}z^{(l)} + b^{(l)}) \quad \forall l = 0, \ldots, L-1$$
$$p_s = \frac{\exp(a_s^{(L)T} z^{(L)})}{\sum_{s'} \exp(a_{s'}^{(L)T} z^{(L)})} \quad \forall s = 1, \ldots, S$$

where $p_s$ is the posterior probability of the s-th senone given x; S is the number of senones; $z^{(l)}$ is input of the l-th layer;

$a_s^{(L)T}$ is the s-th row vector of the matrix $A^{(l)}$; $\sigma(\cdot)$ is an element-wise sigmoid function. The predicted posterior probability, $p_s$, can be converted to scaled conditional likelihood of senone s given x using:

$$p(x|s) = \frac{p_s p(x)}{q_s} \propto \frac{p_s}{q_s}$$

where $q_s$ is the prior probability of the s-th senone.

The weight matrices $A^{(l)}$ and the bias vectors $b^{(l)}$ of the DNN can be estimated by minimizing the following cross entropy based loss function:

$$\mathcal{L}(X^{tr}) = -\sum_{t=1}^{T} \log p(s_t | x_t)$$

where $X^{tr} = (x_1, \ldots, x_T)$ is a set of training feature vectors; $s_t$ is the senone label of $x_t$. The optimization of a large-footprint DNN (or other DNN) may be done by using back-propagation stochastic gradient decent. For example, given a mini-batch of training features, $X^{mb}$, and the corresponding labels, the weight matrix $A^{(l)}$ is updated using $$A^{(l)} \leftarrow A^{(l)} + \varepsilon \frac{\partial \mathcal{L}(X^{mb})}{\partial A^{(l)}}$$

in which $\varepsilon$ is the learning rate.

The large-footprint DNN 402 may be passed to a transform engine 404, where one or more techniques to alter the structure of the large footprint DNN 402 may be applied. For example, the transform engine 404 may apply a singular value matrix decomposition (SVD) based footprint reduction to shrink the memory and or computing processing resources required to implement the DNN. For example, instead of using a N-by-M matrix $A^l$ to connect the l-th and (l+1)-th layers, a product of two small matrices, $A_U^l \in \mathbb{R}^{N \times R}$ and $A_V^l \in \mathbb{R}^{R \times M}$ may be used to approximate $A^l$, e.g., $$A^l \approx A_U^{(l)} A_V^{(l)}$$

where R is the number of retained singular values. The number of elements in the original $A^l$ is N×M, while the number of elements in the two small matrices is (N+M)R. In cases where R<<min (N+M), this may significantly reduce the number of model parameters. After the SVD decomposition, it is also possible to use back-propagation to fine-tune $A_U^{(l)}$ and $A_V^{(l)}$ recover the accuracy loss when a very small R is used.

The transform engine 404 may perform additional or other operations on a large-footprint DNN 402. For example, a split-vector quantization may be applied to the large-footprint DNN 402. Indeed, aspects of technology include applying a split-vector quantization method on a large-footprint DNN 402 having an N-by-R Matrix A. The split-vector quantization may result in an approximation of the Matrix A that requires less storage space and less computational power when in use. As such, the result of the application of a split-VQ method forms a small-footprint DNN.

For example, an N-by-R matrix A may be approximated by matrix Ã whose values come from a smaller (e.g., small-footprint) matrix. Thus, minimizing the following error function may yield a, usable matrix Ã:

$$e = \|A - \tilde{A}\|_F^2$$

In this equation, $\|A\|_F$ is the Forbenius norm of matrix A. Due to the use of the sigmoid function in the neural network, the value of each input node of a hidden layer is restricted in the [0, 1] range.

Therefore, often times there are many sub-vectors in the weight matrix following similar patterns, which weights may be jointly approximated. To approximate the values for similar row-vectors, each row vector is of the matrix is split into J d-dimensional streams, e.g., $$A = \begin{bmatrix} a_{1,1}^T & a_{1,2}^T & \ldots & a_{1,J}^T \\ a_{2,1}^T & a_{2,2}^T & \ldots & a_{2,J}^T \\ \vdots & \vdots & \ddots & \vdots \\ a_{N,1}^T & a_{N,2}^T & \ldots & a_{N,J}^T \end{bmatrix}$$

in which $a_{N,J}^T \in \mathbb{R}^d$ is the sub-vector which can be located as the j-th stream in the m-th row vector and Jd=R. Each of these N×J sub-vectors is approximated by one of K centroids, or codewords. Here K is the size of the codebook, which controls the trade-off between approximation errors and model footprint. Given this structure Ã, the cost function becomes:

$$e = \sum_{n=1}^{N} \sum_{j=1}^{J} \|a_{n,j} - m_{k(n,j)}\|^2$$

in which $k(n,j) \in \{1, \ldots, K\}$ is the index of the nearest codeword for the sub-vector $a_{n,j}$, $m_k$ is the k-th codeword. As used herein a codeword may be a sub-vector that stores the approximated values of sub-vectors in the original matrix. A codebook may be generated using the exemplary method described with respect to FIG. 5, below. Using this sub-vector quantization scheme, a codebook may be represented by d×K numbers and $$\log_2 K \times \frac{NR}{d}$$

bits to represent the indices. Thus, compared with using N×R numbers to represent the matrix, the proposed split—VQ may reduce the model size. Aspects of the technology include splitting a matrix into column vectors using the same or similar process as described above.

Aspects of the technology also include a fine tune engine 408, where a codeword may be fine-tuned. The fine tune engine may be used to minimize the cross entropy-based loss function as described in above, such as the cross entropy-based loss function:

$$A^{(l)} \leftarrow A^{(l)} + \varepsilon \frac{\partial \mathcal{L}(X^{mb})}{\partial A^{(l)}}$$

Minimization may occur in a variety of ways. For example, the gradient of the loss function with respect to the codeword $m_k$ may be obtained using the chain rule:

$$\frac{\partial \mathcal{L}(X^{mb})}{\partial A^{(l)}} = \frac{\partial \mathcal{L}(X^{mb})}{\partial vec(A)} \frac{\partial vec(A)}{\partial m_k} = \sum_{(n,j) \in k} \frac{\partial vec(X^{mb})}{\partial a_{n,j}}$$

Where vec is an operation to vectorize the Matric A; is $(n,j) \in k$ means $m_k$ is $a_{n,j}$'s nearest codeword.

Additional aspects of the technology include the fine tune engine 408 using adaptive learning rate in cases where codewords have a different number of subvectors. For example, a codeword $m_k$ is updated in a mini-batch using the equation:

$$m_k \leftarrow m_k + \frac{\varepsilon}{N_k} \sum_{(n,j) \in k} \frac{\partial \mathcal{L}(X^{mb})}{\partial a_{n,j}}$$

where $N_k$ is the number of sub-vectors associated with $m_k$.

Figure 5:
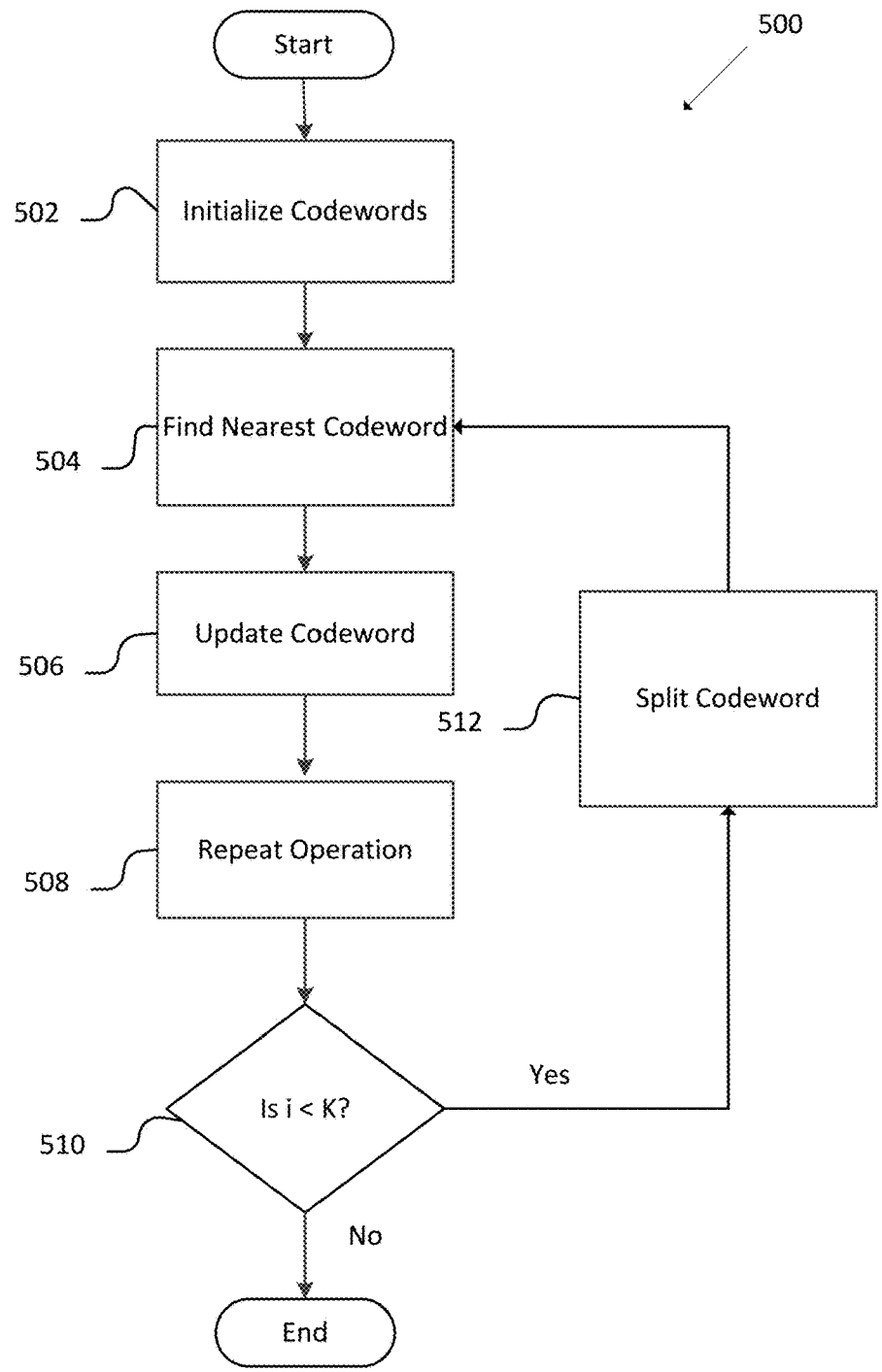
FIG. 5 is an exemplary method of finding one or more codewords.

FIG. 5 is a method 500 of generating a codebook, which codebook is a set of one or more codewords. The method 500 may be performed by a computing device, such as remote computing device 108 from FIG. 1. In alternate examples, the method 500 may be performed by multiple computing devices, where different steps are performed by different machines. For example, the method 500 may be performed using a distributed computing network (e.g., a cloud network). The operations of the method 500 may be implemented in hardware, software, or a combination of hardware and software. In examples, the input is a set of sub-vectors $\{a_{n,j}\}$ and a desired codebook of size K. The method results in an output of $m_1, \ldots, m_k$ and the address book $\{k(n,j)\}$. The method begins with initialize codewords operation 502. For example, two codewords may be initialized by letting i=2, and initializing two codewords m1 and m2 by $$m_1 = m_0 + \sqrt{\Sigma_0}$$

where $m_0$ is the mean vector of all the sub-vectors, $\Sigma_0$ is the corresponding diagonal covariance matrix, and the square root operation is performed element-wise.

The method proceeds to find nearest codeword operation 504. In aspects, a codeword is identified that has the minimum Euclidean distance to the subvector. The nearest codeword for each $a_{n,j}$ may be found using the following equation:

$$k(n,j) = \arg \min_{k=1}^{i} \|m_k - a_{n,j}\|^2$$

The method proceeds to update code word operation 506. A code word may be updated by using the following equation:

$$m_k = \frac{\sum_{(n,j) \in k} a_{n,j}}{\sum_{(n,j) \in k} 1}$$

where $(n,j) \in k$ means that $m_k$ is the nearest codeword $a_{n,j}$.

The method may then proceed to repeat operation 508. In repeat operation 508, operations 504 and 506 are repeated for a set number of times. In examples, the number of times is two to three times, although one of skill in the art will appreciate that the operations may be repeated any number of times. For example, the process may repeat in order to allow a solution to converge. In some embodiments, a codeword with the minimum distance cannot be found on the first iteration.

The method then proceeds to determine operation 510. In determine operation 510, it is determined whether a certain minimum number of codewords have been generated. Following the equation above, it is determined whether i<K. If i<K then the method proceeds to operation 512. If not the method ends.

In operation 512, the codeword is $m_k$ is split. In aspects, every codeword is split into two by adding and subtracting its mean value with the standard deviation in this cluster. For example, each codeword may be split using the following equation:

$$m_{2k+1} = m_k - \sqrt{\Sigma_k}, \ m_{2k} = m_k + \sqrt{\Sigma_k} \text{ and } i \leftarrow 2i$$

where $m_k$ and $\Sigma_k$ are the mean vector and diagonal matrix of the sub-vectors associated with the k-th codeword respectively. After operation 512, the method returns to operation 504.

Figure 6:
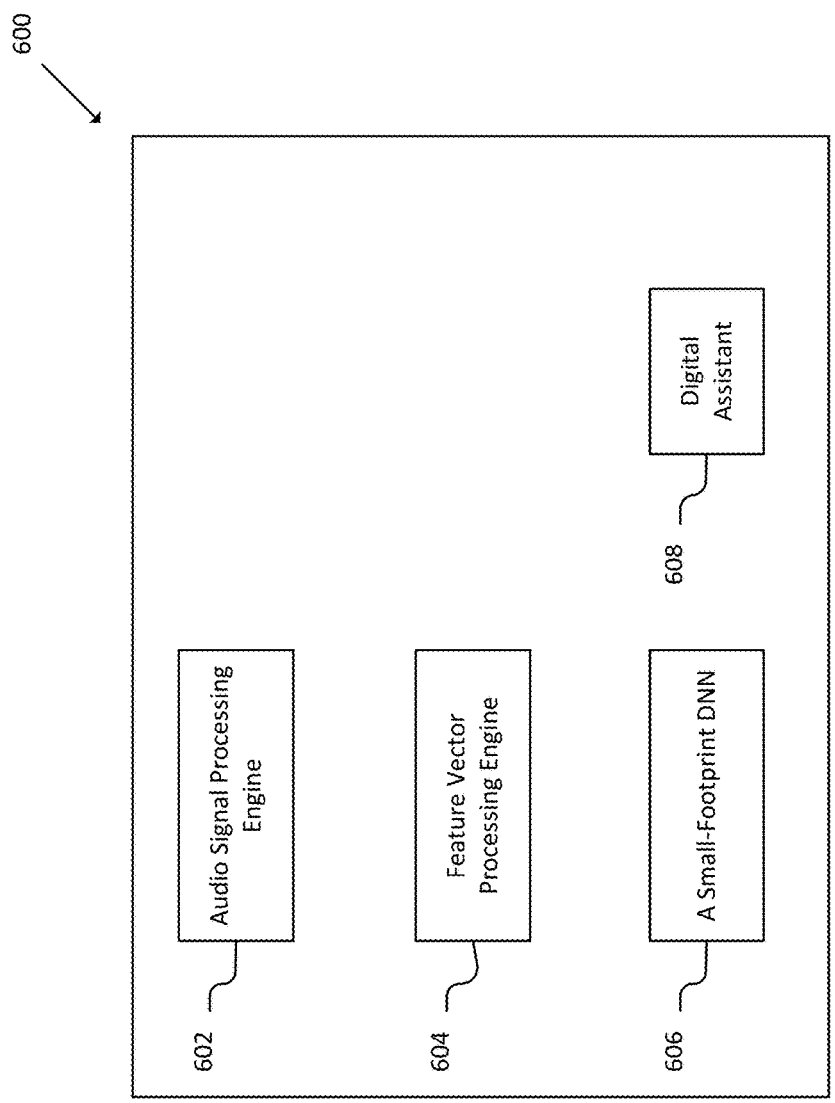
FIG. 6 illustrates an exemplary system in which the technologies described herein may be implemented.

FIG. 6 illustrates an embodiment of a system in which the technologies described herein may be implemented. As illustrated, the system 600 includes an audio signal processing engine 602, a feature vector processing engine 604, a small-footprint DNN 606, and a digital assistant 608.

An audio signal processing engine 602 may receive an audio signal in the form of an analog or digital signal. The audio signal may correspond to a series of utterances by a user. For example, the user may provide natural language input into a mobile device by asking a digital assistant "Where is a good place to park?" Aspects of the technology disclosed herein include the audio signal processing engine 602 analyzing the audio signal on a rolling time-interval basis. For example, the audio signal may be analyzed in 10 millisecond increments every 1 MS, such that a 20 MS audio clip would be analyzed in nine 10 millisecond segments. These segments may be sent to the feature vector processing engine for further processing. In other aspects, the audio signal is analyzed on an interval basis. For example, a 5 millisecond sample may be analyzed, followed by the next 5 millisecond sample. Thus, for a 20 MS audio clip, four segments would be analyzed. Audio signal processing is further described with respect FIG. 7

The feature vector processing engine 604 may analyze the audio signal to determine or identify input feature vectors. For example, the feature vector processing engine 604 may analyze one or more time-intervals of one or more audio signals to identify input feature vectors associated with the one or more time-intervals. Input feature vectors may correspond to one or more particular features of the audio signal such as spectral features, waveform features, higher level features, perceptual parameter features, etc. These feature vectors may then be analyzed by a neural network. For example the feature vectors may be analyzed by a small-footprint DNN 606. Feature vector processing is further described with respect to FIG. 7.

The small-footprint DNN may receive the feature vectors. Inputting the feature vector into the neural network may return information regarding the most likely phrase corresponding to the audio input. Analyzing input vectors by the DNN is further described with respect to FIG. 7. This information may be fed to a digital assistant, such as a digital assistant 608.

The digital assistant 608 may be a digital assistant for a mobile device. For example, the digital assistant may interact with a user to perform a variety of tasks such as set calendar reminders, get directions, send text, call contacts, etc. In examples, the digital assistant 608 may receive input from a user via a graphical user interface, via an audio interface (e.g., a microphone), or via any other interface provided by the device. As such, the digital assistant may receive verbal instructions and queries from a user, which may need to be converted from an audio signal into digital input recognizable by the digital assistant. While FIG. 6 is illustrated as including a digital assistant 608, one of skill in the art will appreciate that other types of applications or processes may interact with the examples provided herein without departing from the scope of this disclosure.

Figure 7:
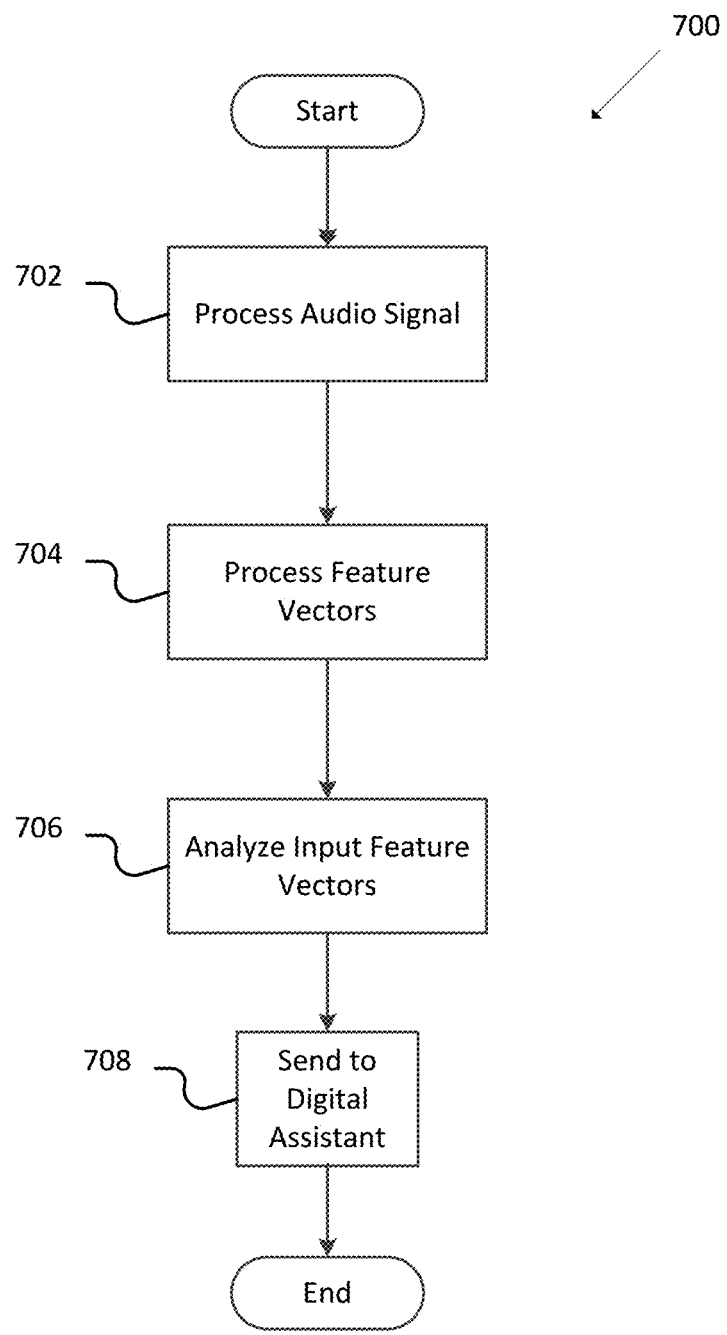
FIG. 7 is an exemplary method of using a small-footprint DNN on a mobile device.

FIG. 7 is a method 700 of using a small-footprint DNN by a device, such as, for example, a mobile device. The method 700 may be performed by a computing device, such as client computing device 102 from FIG. 1. In alternate examples, the method 700 may be performed by multiple computing devices, where different steps are performed by different machines. For example, the method 700 may be performed using a distributed computing network (e.g., a cloud network). The operations of the method 700 may be implemented in hardware, software, or a combination of hardware and software. Method 700 begins with process an input, such as a natural language text input or audio signal operation 702. In aspects, at process audio signal operation 702 an audio signal is processed. The audio signal may be received via an interface, such as a microphone. In alternate examples, the audio signal may be received from another device, such as a device communicatively coupled to the device performing the method 700. The audio signal may be received in different forms. For example, an audio signal may be received as an analog or digital approximation of an analog wave. The signal may be divided up into sections, such as 10 millisecond sections.

Method 700 then proceeds to process feature vector operation 704. In process feature vector operations, auto signal is analyzed to identify input feature vectors to provide to a DNN, such as a small-footprint DNN.

Method 700 then proceeds to analyze input feature vector operation 706. In analyze input feature vector operation 706, the feature vectors are analyzed by a DNN, such as a small-footprint DNN, to determine the probability that the audio signal corresponds to a word, phrase or utterance. Aspects of the technology include the converted the audio signal into digital input that can be processed by a digital assistant or other type of application. The input is then provided to the digital assistant or other type of application at operation 708.

Figure 8:
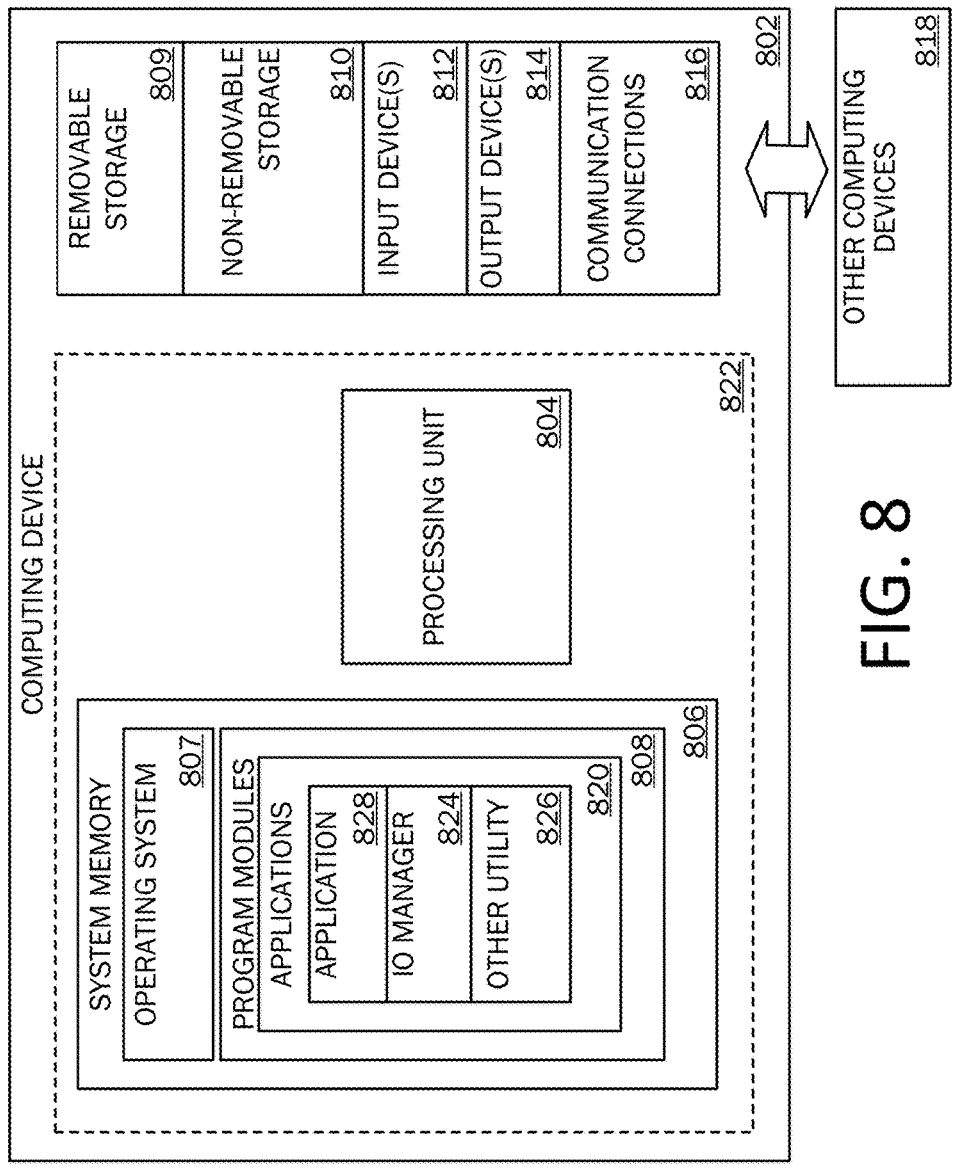
FIG. 8 is a block diagram illustrating physical components of a computing device.
Figure 9A:
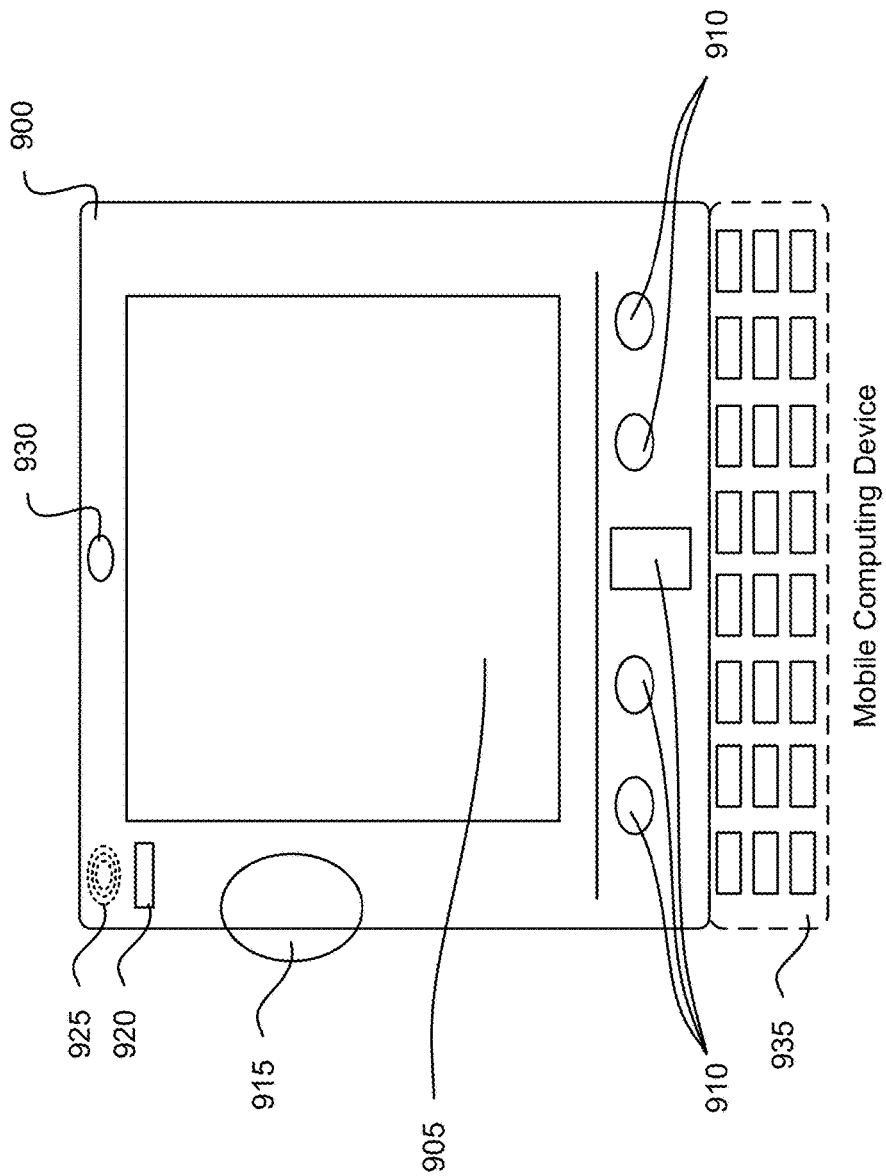
FIGS. 9A and 9B illustrate a mobile computing device on which the innovative concepts described herein may be practiced.
Figure 9B:
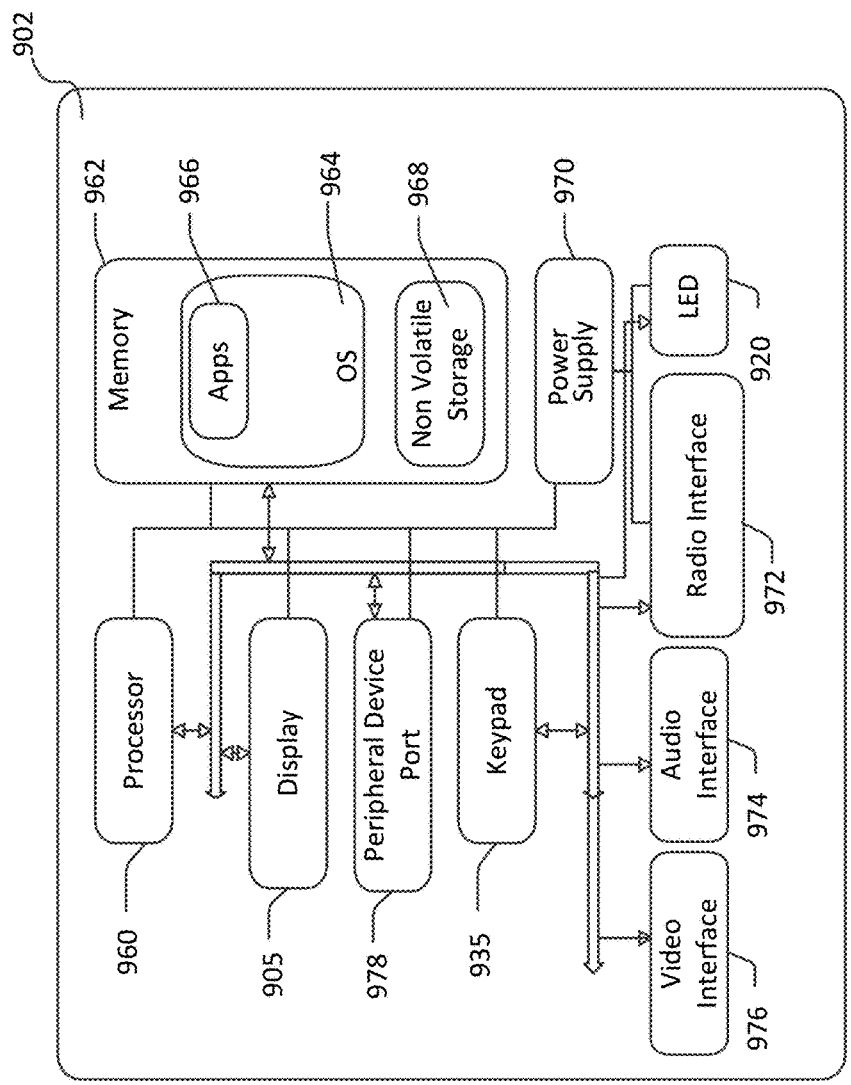
Figure 10:
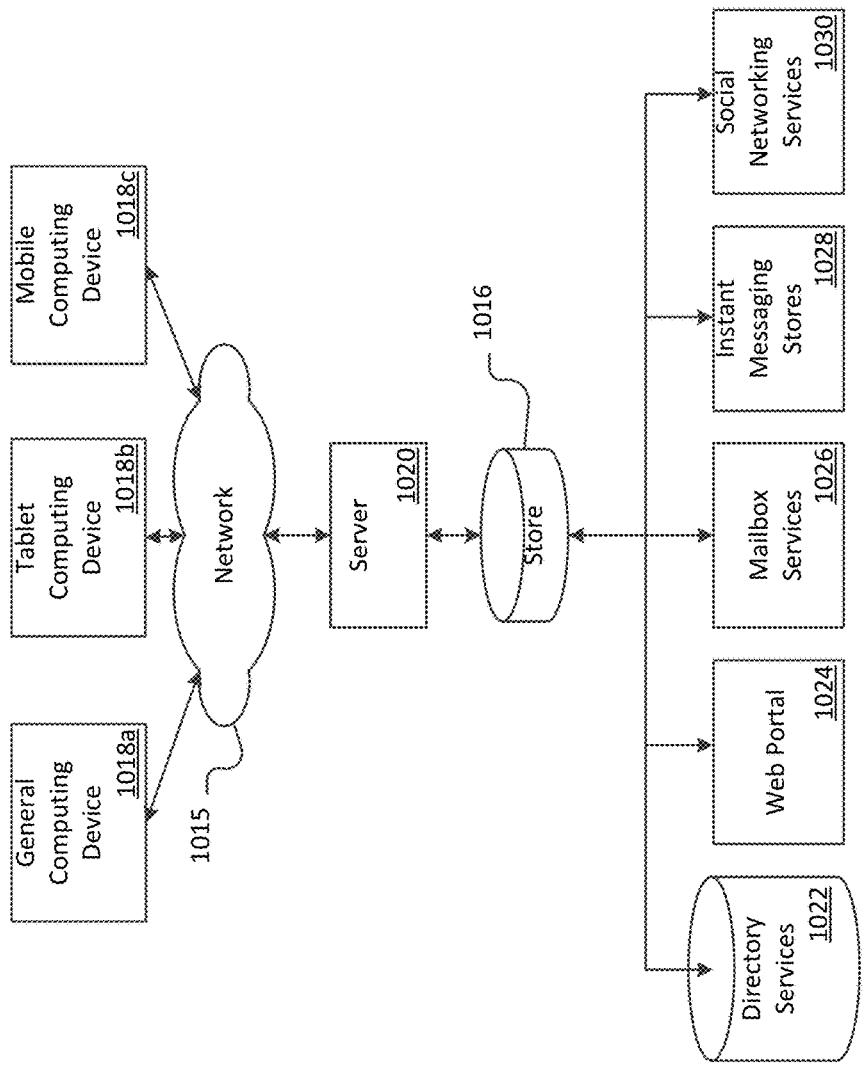
FIG. 10 illustrates one example of the architecture of a system for converting, accessing, and storing a small-footprint DNN.

FIGS. 8-10 and the associated descriptions provide a discussion of a variety of operating environments in which examples of the invention may be practiced. However, the devices and systems illustrated and discussed with respect to FIGS. 8-10 are for purposes of example and illustration and are not limiting to a vast number of computing device configurations that may be utilized for practicing examples of the invention, described herein.

FIG. 8 is a block diagram illustrating physical components of a computing device 802, for example a component of a system with which examples of the present disclosure may be practiced. The computing device components described below may be suitable for the computing devices described above. In a basic configuration, the computing device 802 may include at least one processing unit 804 and a system memory 806. Depending on the configuration and type of computing device, the system memory 806 may comprise, but is not limited to, volatile storage (e.g., random access memory), non-volatile storage (e.g., read-only memory), flash memory, or any combination of such memories. The system memory 806 may include an operating system 807 and one or more program modules 808 suitable for running software applications 820 such as application 828, IO manager 824, and other utility 826. As examples, system memory 806 may store instructions for execution. Other examples of system memory 806 may include a knowledge resource or learned program pool. The operating system 807, for example, may be suitable for controlling the operation of the computing device 802. Furthermore, examples of the invention may be practiced in conjunction with a graphics library, other operating systems, or any other application program and is not limited to any particular application or system. This basic configuration is illustrated in FIG. 8 by those components within a dashed line 822. The computing device 802 may have additional features or functionality. For example, the computing device 802 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 806. While executing on the processing unit 804, the program modules 808 (e.g., application 828, Input/Output (I/O) manager 824, and other utility 826) may perform processes including, but not limited to, one or more of the stages of the operational method 300 illustrated in FIG. 3, for example. Other program modules that may be used in accordance with examples of the present invention may include applications for electronic mail and contacts, word processing, spreadsheet, database, slide presentation, input recognition, or drawing or computer-aided drafting, and other application programs.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 802 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 802 may also have one or more input device(s) 812 such as a keyboard, a mouse, a pen, a sound input device, a device for voice input/recognition, a touch input device, etc. The output device(s) 814 such as a display, speakers, a printer, etc. may also be included. The aforementioned devices are examples and others may be used. The computing device 804 may include one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 806, the removable storage device 809, and the non-removable storage device 810 are all computer storage media examples (e.g., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 802. Any such computer storage media may be part of the computing device 802. Computer storage media does not include a carrier wave or other propagated/modulated data signals.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a personal data assistant, a tablet personal computer, a laptop computer, and the like, with which examples of the invention may be practiced. For example, mobile computing device 900 may be implemented as system 100, components of systems 100 may be configured to execute processing methods as described in FIG. 4, among other examples. With reference to FIG. 9A, one example of a mobile computing device 900 for implementing the examples is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative examples, mobile computing device 900 may incorporate more or less input elements. For example, the display 905 may not be a touch screen in some examples. In yet another alternative example, the mobile computing device 900 is a portable phone system, such as a cellular phone. The mobile computing device 900 may also include an optional keypad 935. Optional keypad 935 may be a physical keypad or a "soft" keypad generated on the touch screen display. In various examples, the output elements include the display 905 for showing a GUI, a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 can incorporate a system (e.g., an architecture) 902 to implement some examples. In examples, the system 902 is implemented as a "smart phone" capable of running one or more applications (e.g., browser, e-mail, input processing, calendaring, contact managers, messaging clients, games, and media clients/players). In some examples, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including application 828, 10 manager 824, and other utility 826 described herein.

The system 902 has a power supply 970, which may be implemented as one or more batteries. The power supply 970 might further include an external power source, such as an AC adapter or a powered docking cradle that supplements or recharges the batteries.

The system 902 may include peripheral device port 978 that performs the function of facilitating connectivity between system 902 and one or more peripheral devices. Transmissions to and from the peripheral device port 978 are conducted under control of the operating system 964. In other words, communications received by the peripheral device port 978 may be disseminated to the application programs 966 via the operating system 964, and vice versa.

The system 902 may also include a radio interface 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with examples of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one example of the architecture of a system for implementing a small network DNN, as described above. A small footprint DNN may be accessed, interacted with, or edited in association with application 828, IO manager 824, other utility 826, and storage may be stored in different communication channels or other storage types. For example, various the aspects of the technology may be stored using a directory service 1022, a web portal 1024, a mailbox service 1026, an instant messaging store 1028, or a social networking site 1030, application 828, IO manager 824, other utility 826, and storage systems may use any of these types of systems or the like for enabling data utilization, as described herein. A server 1020 may provide storage system for use by a client operating on general computing device 802 and mobile device(s) 900 through network 1015. By way of example, network 1015 may comprise the Internet or any other type of local or wide area network, and client nodes may be implemented as a computing device 802 embodied in a personal computer, a tablet computing device, and/or by a mobile computing device 900 (e.g., a smart phone). Any of these examples of the client computing device 802 or 900 may obtain content from the store 1016. In one aspect of the architecture a computing device 1018a, a tablet 1018b, and/or mobile device 1018C may be used to implement the technology described above.

It is noted, the small-footprint DNN may be capable of recognizing a greater vocabulary range than a similarly sized DNN that does not use codewords.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed:

1. A system comprising:
    at least one processor; and
    a memory storage device, the memory storage device comprising instructions, that, when executed by the at least one processor, perform a method of generating a small-footprint matrix based on a large-footprint matrix of a neural network, the method comprising:
        receiving a first matrix of a neural network, wherein the first matrix comprises a vector, and the vector including a sub-vector;
        generating a code book based on the first matrix, wherein the code book comprises a codeword and an index, wherein the first codeword is a representation of the sub-vector, and wherein the index refers to the codeword;
        identifying a first codeword and a first index from the code book, wherein the first codeword approximates the sub-vector and the first index refers to the first codeword in the code book; and
        generating a second matrix of the neural network based on the first matrix, wherein the second matrix comprises the first index in place of the sub-vector, the second matrix being smaller in footprint than the first matrix.

2. The system of claim 1, further comprising:
    identifying the first codeword and the first index for the first codeword from the code book, wherein the first matrix includes a second vector, the second vector including a second sub-vector, and the first codeword approximating a second sub-vector in the first matrix; and
    generating the second matrix of the neural network based on the first matrix, wherein the second matrix comprises the first index in place of the second sub-vector.

3. The system of claim 2, wherein the second matrix refers to the first codeword in the code book based on the first index.

4. The system of claim 1, further comprising,
fine-tuning the codeword, wherein the codeword is a numerical representation of the sub-vector.

5. The system of claim 1, wherein the first matrix of the neural network is shared remotely over a network by a mobile device.

6. The system of claim 1, wherein the method further comprises:
sending the second matrix to a mobile device.

7. The system of claim 1 further comprising:
receiving an audio input; and
determining a phoneme that approximates the audio input based on the second matrix.

8. A computer implemented method of generating a small-footprint matrix based on a large-footprint matrix of a neural network, the method comprising:
receiving a first matrix of a neural network, wherein the first matrix comprises a vector and the vector including a sub-vector;
generating a code book, wherein the code book comprises a codeword and an index, wherein the codeword is a representation of the sub-vector, and wherein the index refers to the codeword;
identifying a first codeword and a first index from the code book, wherein the first codeword approximates the sub-vector and the first index refers to the first codeword; and
generating a second matrix of the neural network based on the first matrix, wherein the second matrix comprises the first index in place of the sub-vector, the second matrix being smaller in footprint than the first matrix.

9. The method of claim 8, further comprising:
identifying the first codeword and the first index for the first codeword from the code book, wherein the first matrix includes a second vector, the second vector including a second sub-vector, and the first codeword approximating a second sub-vector in the first matrix; and
generating the second matrix of the neural network based on the first matrix, wherein the second matrix comprises the first index in place of the second sub-vector.

10. The method of claim 9, further comprising
fine-tuning the first codeword, wherein the codeword is a numerical representation of the sub-vector.

11. The method of claim 9, wherein the second matrix refers to the first codeword in the code book based on the first index.

12. The method of claim 8, wherein the method further comprises:
sending the second matrix to a mobile device.

13. The method of claim 8 further comprising:
receiving an audio input; and
determining a phoneme that approximates the audio input based on the second matrix.

14. A computer readable storage device storing instructions that perform a method of generating a small-footprint matrix based on a large-footprint matrix of a neural network, when executed, the method comprising:
receiving a first matrix of a neural network, wherein the first matrix comprises a vector and the vector including a sub-vector;
generating a code book, wherein the code book comprises codeword and an index, wherein the first codeword is a representation of the sub-vector, and wherein the index refers to the codeword;
identifying a first codeword and a first index from the code book, wherein the first codeword approximates the sub-vector and the first index refers to the first codeword in the code book; and
generating a second matrix of the neural network based on the first matrix, wherein the second matrix comprises the first index in place of the sub-vector, the second is matrix being smaller in footprint than the first matrix.

15. The computer readable storage device of claim 14, the method further comprising:
identifying the first codeword and the first index for the first codeword from the code book, wherein the first matrix includes a second vector, the second vector including a second sub-vector, and the first codeword approximating the second sub-vector in the first matrix; and
generating the second matrix of the neural network based on the first matrix, wherein the second matrix comprises the first index in place of the second sub-vector in the second matrix.

16. The computer readable storage device of claim 15, the method further comprising,
fine-tuning the codeword, wherein the codeword is a numerical representation of the sub-vector.

17. The computer readable storage device of claim 16, wherein fine tuning the codeword comprises using an adaptive learning rate.

18. The computer readable storage device of claim 15, wherein the second matrix refers to the first codeword in the code book based on the first index.

19. The computer readable storage device of claim 14, wherein the method further comprises:
sending the second matrix to a mobile device.

20. The computer readable storage device of claim 14 further comprising:
receiving an audio input; and
determining a phoneme that approximates the audio input based on the second matrix.

* * * * *